Jan. 14, 1969  G. T. MILLER  3,421,846
PRODUCTION OF SODIUM PHOSPHATES
Filed June 7, 1965
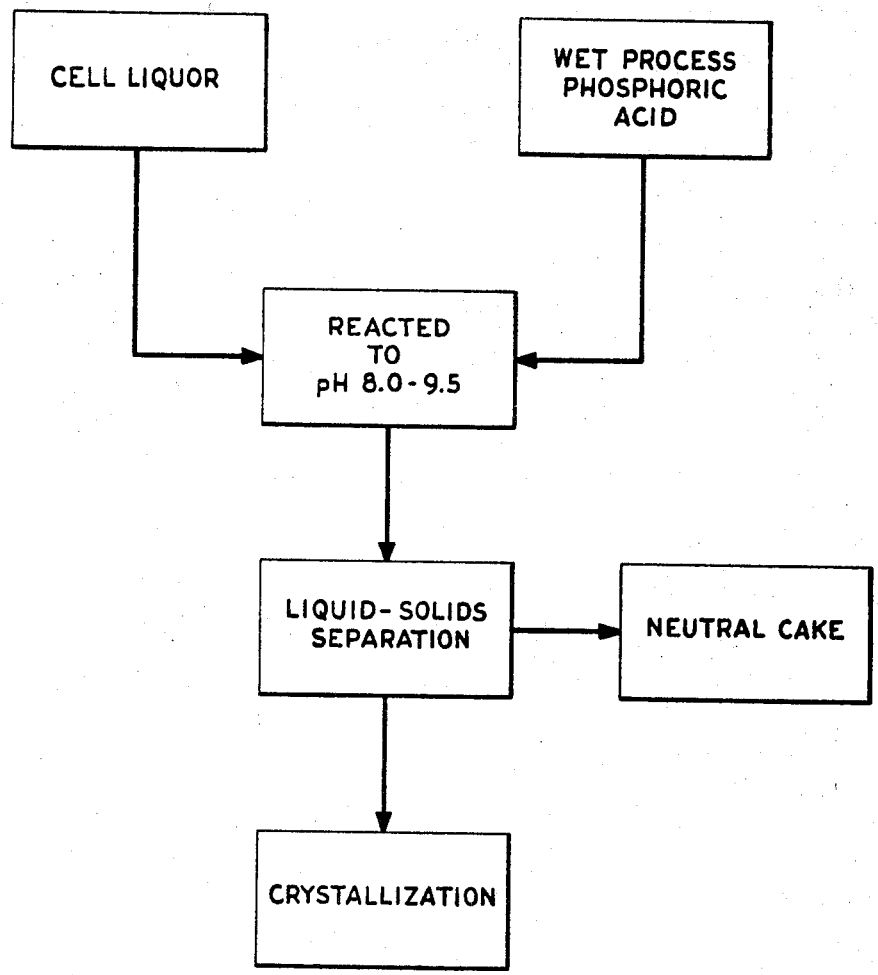

United States Patent Office
3,421,846
Patented Jan. 14, 1969

3,421,846
PRODUCTION OF SODIUM PHOSPHATES
George T. Miller, Lewiston, N.Y., assignor to Hooker Chemical Corporation, Niagara Falls, N.Y., a corporation of New York
Filed June 7, 1965, Ser. No. 462,026
U.S. Cl. 23—107    11 Claims
Int. Cl. C01b 25/30

ABSTRACT OF THE DISCLOSURE

The production of pure disodium phosphates by reacting phosphoric acid with crude sodium hydroxide to produce a solid phase and a liquid phase, separating the solid and liquid phases, and crystallizing disodium phosphates from the liquid phase.

---

This invention relates to the manufacture of sodium phosphates and derivatives thereof. More particularly, this invention relates to the production of sodium phosphates by the direct reaction of crude phosphoric acid and crude sodium hydroxide.

Sodium phosphates such as monosodium phosphate, disodium phosphate, sodium tripolyphosphate, and the like, are well known compounds obtained by the reaction of phosphoric acid with sodium hydroxide or sodium carbonate. The methods of manufacture generally involve reactions with relatively pure reactants since the end products are normally desired free from impurities. The purification of the reactants increases the expense and complexity of alkali metal phosphate production. A process whereby crude reactants can be used to produce a product of commercially acceptable purity is therefore most useful.

However, the problem of separating the impurities contained in both the crude acid and the cell liquor appears to be insurmountable in that the acid soluble impurities may be largely precipitated by neutralizing the solution to a basic condition and the alkaline soluble impurities may be largely removed by acidifying to an acid condition, while some of the impurities are soluble under both acidic and basic conditions, but in each instance, undesirable impurities remain with the reactants. To attempt to teeter between acidic and basic conditions to thereby remove both acidic and basic insoluble impurities would require the use of at least one pure reactant since additional impurities are added each time the pH conditions are changed by the addition of one or the other reactant. To obtain the proper Na/P mole ratio to produce disodium phosphate, a basic solution results which would lead one to believe that the basic reactant would have to be substantially free of alkaline soluble impurities to produce a commercially acceptable sodium phosphate product.

It is an object of this invention to provide a method of utilizing crude reactants while effecting the production of alkali metal phosphates of commercially acceptable purity. It is another object of this invention to provide a method wherein crude phosphoric acid is reacted with chlor-alkali diaphragm-cell catholyte liquor to produce pure white sodium phosphates. These and other objects will become apparent to those skilled in the art from the description of the invention.

In accordance with the invention, a method is provided for the production of sodium phosphate comprising reacting phosphoric acid with crude sodium hydroxide in a ratio to produce a solid and a solution containing metal ions and phosphate ions, separating the solid from the solution and crystallizing sodium phosphate from the solution.

The present invention provides a method of utilizing inexpensive reactants to produce sodium phosphates and also provides a method of separating both the water soluble and the water insoluble impurities from the sodium phosphate salts. Previously, crude reactants such as cell liquor were not used to produce sodium phosphates in view of the fact that cell liquor contains large quantities of undesirable impurities. It is indeed surprising that a product of sufficient purity, to meet commercial quality requirements is readily obtained by the present method. A commercially acceptable product must be pure white and substantially free of the impurities found in crude phosphoric acid and cell liquor. The use of both a crude phosphoric acid, often called "wet acid" and a crude sodium hydroxide such as "cell liquor," introduces a high percentage of undesirable ions and impurities into the reaction solution. These impurities must be removed or separated from the sodium phosphate to obtain a commercially acceptable product. The present invention provides a method for obtaining pure white sodium phosphates from crude reactants which process includes a method of separating from the desired product, both the water soluble and the water insoluble impurities found in the reactants.

The term "crude phosphoric acid" or "wet acid" means phosphoric acid derived from the acidulation of phosphate rock, as by the reaction of phosphate rock with sulfuric acid, or other phosphoric acid production methods. Such unrefined acids contain substantial quantities of impurities such as silica, fluorides, metal ions such as those of iron, aluminum, vanadium, manganese, and the like. The $P_2O_5$ content of these acids ranges from about 30 percent to about 70 percent by weight. If desired, a purified phosphoric acid can be used instead, but it will be more expensive. Therefore, phosphate ions mean $H_2PO_4^-$, $HPO_4^{--}$ and $PO_4^{---}$.

The term "crude sodium hydroxide" or "cell liquor" means a sodium hydroxide solution contaminated with impurities such as sodium chloride. Particularly, it describes a solution obtained directly from the catholyte compartment of electrolytic cells, such as, chlor-alkali diaphragm cells. Cell liquor is an aqueous solution containing about 9 percent to about 15 percent sodium hydroxide and about 9 percent to 16 percent sodium chloride. In addition, such solutions normally contain 0.2 percent to 0.3 percent sulfate values, 0.1 percent to 0.2 percent chlorate values and minor amounts of silicon values, calcium values, magnesium values and carbonaceous materials and trace amounts of copper, nickel and iron. Thus, cell liquor is a relatively impure and crude source of sodium hydroxide containing impurities which add to and further complicate the recovery of a purified sodium phosphate therefrom.

The invention will be further described by reference to the drawing which is a flow sheet illustrating the process of the present invention.

The recovery of pure sodium phosphates from wet process phosphoric acid and cell liquor involves several steps. First, the crude acid and cell liquor are mixed to form a slurry, the liquid phase, at temperatures above about 50 degrees centigrade, being a solution containing primarily disodium phosphate ($Na_2HPO_4$), sodium chloride and other water soluble impurities. The solid phase is a precipitated complex of metal phosphates and fluosilicates, cryolites, and the like. The precipitate contains a major portion of the ferric, aluminum, vanadium, manganese, and the like metals present in the starting acid. The removal of the precipitated solids thus gives a separation of phosphate values from most of the metal and fluoride contaminants initially present in the crude reactants.

The liquid phase, separated from the solid phase, is cooled to below about 50 degrees centigrade down to about 0 degrees centigrade to bring about the crystallization of hydrates of disodium phosphate. Disodium phosphate heptahydrate ($Na_2HPO_4 \cdot 7H_2O$) is recovered at temperatures above about 20 degrees centigrade to 25 degrees centigrade and disodium phosphate dodecahydrate ($Na_2HPO_4 \cdot 12H_2O$) is obtained if the crystallization temperature is lower than about 20 degrees centigrade. It is often preferred to crystallize the sodium phosphate in two stages to obtain most of the disodium phosphate as the heptahydrate and the remainder of the disodium phosphate as the dodecahydrate in that this provides the highest phosphate recovery from the solution with the lowest amount of water of hydration.

The crystallization and subsequent water washing of the crystals provides a separation of the phosphate values from the sodium chloride, the sodium sulfate and other impurities introduced with the cell liquor, as well as providing a separation from the remaining water soluble metal impurities found in the mother liquor. Since sodium chloride and water are separated during the sodium phosphate crystallization, crystallization temperatures above the freezing point of water (about 0 degrees centigrade) are used. Preferably, a crystallization temperature of less than 5 degrees centigrade is not used.

The crystalline disodium phosphate product obtained may be used or sold as such or converted to other polyphosphates. By calcining, sodium pyrophosphate is produced. The addition of one mole of phosphoric acid per five moles of disodium phosphate and subsequently calcining yields sodium tripolyphosphate. By adding one mole of phosphoric acid per mole of disodium phosphate and subsequently calcining, sodium metaphosphate is obtained. In reacting the recovered disodium phosphate to other polyphosphates by the addition of phosphoric acid, the phosphoric acid used is preferably a purified acid so that the need for any further purification of the product may be avoided.

In the process of this invention, the utilization of certain preferred reaction conditions provides a most economical process for the production of sodium phosphates. It is therefore preferred to use a wet acid of somewhat higher $P_2O_5$ content than about 30 percent and preferably a wet process phosphoric acid having a $P_2O_5$ content in the range of about 45 percent to 70 percent. Such higher concentrations minimize the dilution of the resulting slurry when cell liquor is added. Alternatively, a more concentrated sodium hydroxide content in the cell liquor may be used. However, the concentration of the cell liquor is normally within a relatively narrow range of about 9 percent to 15 percent sodium hydroxide, which is entirely satisfactory.

It is preferred to effect the reaction between the wet process phosphoric acid and cell liquor by simultaneously mixing the reactants together at an elevated temperature in a Na/P mole ratio of about 1.9 to 2.1 to provide a pH of between about pH 8.0 and pH 9.5 in the neutralized slurry. Most preferably, a pH within the narrower range of pH 8.5 to pH 9.0 is used.

The temperature at which the reactants are mixed can be from about room temperature (20 degrees centigrade) to the boiling point of the solution. While the reactants can be mixed at relatively low temperatures, the solids removal is best effected at temperatures above the crystallization point of the sodium phosphate. Therefore, it is preferred to remove the solid phase from the solution at a temperature above about 40 degrees centigrade and more, preferably above 50 degrees centigrade and below the boiling point of the solution, which is about 100 degrees centigrade. Of course, separations can be accomplished at lower temperatures when lesser concentrations of sodium and phosphate ions are present in the solution or when the highest possible yield need not be attained.

The precipitate formed during the addition of the reactants is preferably filtered, centrifuged, decanted, or passed through some other liquid-solid separation means at the preferred elevated temperatures. The filtrate is then cooled to a temperature below about 50 degrees centigrade to crystallize disodium phosphate. The amount of cooling is related to the concentration of sodium ions and phosphate ions present in the solution, the particular hydrate desired, and the desired percentage of recovery of sodium phosphate values from the solution. Thus, in a batch process wherein the highest recovery of sodium phosphate is desired in a single step, temperatures approaching the crystallization point of water, that is, not less than about 0 degrees centigrade, are used. Of course, where the heptahydrate is desired, temperatures above about 20 degrees centigrade are used.

When using continuous crystallization techniques, the particular temperature used depends upon whether the heptahydrate or the dodecahydrate is desired. Continuous crystallization techniques can be used, such as continuously feeding filtrate to a continuous low temperature crystallizer. In such an instance, the mother liquor can be recycled after a sodium chloride removal step. Thus, all of the sodium phosphate values need not be removed in a single step and higher crystallization temperatures can be economically employed. Also, a two-step crystallization is thus conveniently used to first separate the heptahydrate at one temperature and then the dodecahydrate at a lower temperature.

The following examples illustrate certain preferred embodiments of the present invention. Unless otherwise indicated, all parts and percentages used herein are by weight and all temperatures are in degrees centigrade.

EXAMPLE 1

This example illustrates the process of the present invention as shown in the drawing, wherein wet process phosphoric acid of 73 percent $H_3PO_4$ content was reacted with chlor-alkali diaphragm-cell catholyte liquor. The reaction was effected by adding 114 parts of wet process phosphoric acid to 660 parts of the cell liquor. The cell liquor had a sodium hydroxide content of 11.3 percent, a sodium chloride content of 15.7 percent and 0.3 percent sulfate values, 0.2 percent chlorate values, minor amounts of calcium, magnesium, silica and trace amounts of iron, copper and nickel. The wet acid contained 1.0 percent of Fe, 1.0 percent of $Al_2O_3$, 140 parts per million of vanadium, 200 parts per million of manganese, 70 parts per million of chromium, 0.3 percent of fluorine and 90 parts per million of calcium. During the wet acid addition, the solution was maintained under agitation. The resultant slurry had a pH of 8.5. The slurry was then heated to 90 degrees centigrade and filtered, thereby removing 49.7 parts of solids, and obtaining a liquid filtrate. The filtrate was cooled to room temperature (22 degrees centigrade). During the cooling period which was about one hour, crystallization occurred. The crystals were removed by filtering at 22 degrees centigrade.

The residual filtrate was then further cooled to 10 degrees centigrade over a period of about one hour, during which time additional crystals were formed. These additional crystals were separated by filtration and were added to the first removed crystals. The recovered crystals were then washed with water at 10 degrees centigrade. The residual mother liquor amounted to 500 parts and contained 0.96 percent disodium phosphate and 19.3 percent sodium chloride. A total of 286 parts of crystals was recovered.

Analysis of the recovered crystals indicated that they contained 35 percent disodium phosphate and 0.2 percent sodium chloride, 4 parts per million of Fe, 40 parts per million of $Al_2O_3$ and trace amounts of vanadium, manganese, chromium, calcium and fluorine, the remaining constituents being primarily water of hydration. The crystals were pure white in appearance.

EXAMPLE 2

The process of Example 1 was substantially repeated by reacting 37.5 parts of wet process phosphoric acid containing 75 percent $H_3PO_4$ and impurities the same and in similar amounts to the wet process acid of Example 1 with 250 parts of cell liquor containing 11.3 percent of sodium hydroxide, 15.7 percent of sodium chloride, 0.18 percent of chlorate, 0.3 percent of sulfate and minor amounts of other impurities. During the addition, the reactants were maintained under agitation while the solution was held at a temperature of 65 degrees centigrade. A diatomaceous earth filter aid was added to the reactant slurry and the slurry was filtered at 65 degrees centigrade. The filtrate was then cooled to room temperature over a period of about one hour during which time crystals were formed. The crystals were removed from the mother liquor by filtration. The removed crystals were then slurried with an equal amount by weight of cold water and refiltered. The crystals obtained were very white in color. Analysis of the crystals indicated that the Na/P mole ratio was 2.83, the phosphorus content was 7.46 percent and the sodium content was 15.7 percent. The analysis indicated a total of 38.5 percent sodium phosphate, the major proportion of the sodium phosphate being disodium phosphate, the residual material being substantially water of hydration.

EXAMPLE 3

Disodium phosphate was produced by reacting pure 85 percent $H_3PO_4$ obtained by the furnace acid method with cell liquor. The reaction was effected by mixing cell liquor of the same composition as that of Example 1 with the furnace phosphoric acid in a Na/P mole ratio of 1.96. An exothermic reaction ensued, increasing the temperature of the reactants to 80 degrees centigrade. The solution was cooled to 25 degrees centigrade over a period of one hour during which time, crystals were formed. The crystals were removed by filtering and then were crushed, prior to washing with cold water.

Analysis of the recovered crystals indicated a sodium phosphate content of 50.4 percent, and a sodium chloride content of 0.33 percent. The high sodium phosphate content indicated that the sodium phosphate was recovered primarily as disodium phosphate heptahydrate. The low sodium chloride content and the pure white crystal appearance compared favorably with that of Example 1.

EXAMPLE 4

Sodium tripolyphosphate, $Na_5P_3O_{10}$ was produced from the product of Example 1 by adding 16.3 parts of a purified 85 percent phosphoric acid to 285 parts of the product of Example 1. The mixture was heated to a temperature of about 375 degrees centigrade thereby calcining the disodium phosphate to sodium tripolyphosphate. On cooling, 103.7 parts of product were recovered. Analysis of the product indicated that it comprised 99.3 percent $Na_5P_3O_{10}$ and 0.57 percent sodium chloride. The color was pure white.

Thus, it is seen that by the present invention a process for utilizing crude phosphoric acid and crude caustic soda can be used to produce a sodium phosphate material of commercially acceptable purity. From the sodium phosphates thus produced, various other sodium phosphates are readily made by further reaction with phosphoric acid and/or calcining. It will also be readily recognized that although the examples are directed primarily to batch crystallizations, the process readily lends itself to continuous reaction of crude phosphoric acid and cell liquor and the continuous crystallization of sodium phosphates from the reaction solutions. Such continuous crystallization processes can utilize a NaCl removal step to retain the salt concentration in the mother liquor below that level at which it would crystallize with the sodium phosphate.

While there have been described various embodiments of the present invention, the methods described are not intended to be understood as limiting the scope of the invention, as it is realized that changes there are possible. It is further intended that each element recited in any of the following claims is to be understood as referring to all elements for accomplishing substantially the same results in substantially the same or equivalent manner. It is intended to cover the invention broadly in whatever form its principles may be utilized.

What is claimed is:

1. A process for the production of pure disodium phosphate which comprises reacting, at a pH of from about 8.0 to about 9.5, impure phosphoric acid containing acid-soluble impurities with an impure aqueous caustic solution containing from about 9 to about 15% sodium hydroxide and from about 9 to about 16% sodium chloride as the principal impurity, said solution obtained directly from a catholyte compartment of an electrolytic cell, in a ratio and at temperatures sufficient to produce a liquid phase containing sodium ions and phosphate ions and a solid phase, filtering the reaction mixture at a temperature between about 40 degrees centigrade and about 100 degrees centigrade to remove the solid phase and subsequently cooling the filtrate to a temperature of between about 0 degrees centigrade to about 40 degrees centigrade, thereby crystallizing disodium phosphate, removing the crystals from the mother liquor and washing the removed crystals with water to provide a crystalline disodium phosphate.

2. A process for the production of pure disodium phosphate which comprises reacting, at a pH of about 8.0 to about 9.5, phosphoric acid with an impure aqueous caustic solution containing from about 9 to about 15% sodium hydroxide and from about 9 to about 16% sodium chloride as the principal impurity, said solution obtained directly from the catholyte compartment of an electrolytic cell, in a ratio and at temperatures sufficient to produce a liquid phase containing sodium ions and phosphate ions and a solid phase, heating the reaction mixture to a temperature of from about 70 degrees centigrade to about 100 degrees centigrade, filtering the reaction mixture while in the heated state to remove the solid phase therefrom, subsequently cooling the filtrate to a temperature of from about 5 degrees centigrade to about 30 degrees centigrade thereby crystallizing disodium phosphate, removing the crystal from the mother liquor and washing the removed crystals with water to provide a pure crystalline disodium phosphate.

3. A process for the production of pure disodium phosphate hydrate which comprises reacting, at a pH of 8.0 to 9.5, phosphoric acid with an impure aqueous caustic solution containing from about 9 to about 15% sodium hydroxide and from about 9 to about 16% sodium chloride as the principal impurity, said solution obtained directly from a catholyte compartment of a clear-alkali diaphragm electrolytic cell, at a ratio and at temperatures to produce a liquid phase containing sodium ions and phosphate ions and a solid phase, filtering the reaction mixture at a temperature in excess of about 50 degrees centigrade to remove the solid phase therefrom, cooling the filtrate to a temperature in the range of 0 degrees centigrade to 40 degrees centigrade, thereby crystallizing disodium phosphate, removing the crystals from the mother liquor, washing the removed crystals with water and recovering a crystalline disodium phosphate hydrate.

4. The process of claim 1 wherein impure phosphoric acid and impure sodium hydroxide reactants are added in a mole ratio to provide a solution containing sodium ions and phosphate ions at a pH of 9.5 to 9.0.

5. The process of claim 1 wherein the phosphate ions in the produced solution are selected from the group consisting of $H_2PO_4^-$, $HPO_4^{--}$ and $PO_4^{---}$.

6. The process of claim 1 wherein the pure phosphoric acid is wet process phosphoric acid having a $P_2O_5$ content of about 30 percent to 70 percent.

7. The process of claim 3 wherein the disodium phosphate crystallized is disodium phosphate heptahydrate.

8. The process of claim 3 wherein the disodium phosphate crystallized is disodium phosphate dodecahydrate.

9. The method of claim 1 wherein the reaction solution is heated to about 50 degrees centigrade to 100 degrees centigrade prior to filtration, and wherein filtration is effected at a temperature of about 50 degrees centigrade to 100 degrees centigrade.

10. The process of claim 1 wherein the crystallization of the disodium phosphates is effected in the temperature range of about 5 degrees centigrade to about 30 degrees centigrade.

11. The process of claim 3 wherein the reaction process and the crystallization are run continuously.

References Cited

UNITED STATES PATENTS

| | | | |
|---|---|---|---|
| 1,984,146 | 12/1934 | Lindberg | 23—107 |
| 1,998,182 | 4/1935 | Anable et al. | 23—107 |
| 2,977,191 | 3/1961 | Pottiez | 23—107 |
| 3,055,735 | 9/1962 | Suzuki et al. | 23—107 |

OTHER REFERENCES

Phosphorus and Its Compounds, vol. II, Technology, Biological Functions, and Applications, Interscience, New York & London, pp. 1214–1215 (1961).

OSCAR R. VERTIZ, *Primary Examiner.*

L. A. MARSH, *Assistant Examiner.*